(12) United States Patent
Bevirt

(10) Patent No.: US 8,251,536 B2
(45) Date of Patent: Aug. 28, 2012

(54) FLASHLIGHT WITH MOUNTING APPARATUS

(75) Inventor: Joeben Bevirt, Santa Cruz, CA (US)

(73) Assignee: DayMen US, Inc., Petaluma, CA (US)

( * ) Notice: Subject to any disclaimer, the term of this patent is extended or adjusted under 35 U.S.C. 154(b) by 0 days.

(21) Appl. No.: 12/426,960

(22) Filed: Apr. 21, 2009

(65) Prior Publication Data
US 2011/0199759 A1    Aug. 18, 2011

Related U.S. Application Data

(63) Continuation-in-part of application No. 11/637,611, filed on Dec. 12, 2006, which is a continuation-in-part of application No. 11/324,994, filed on Jan. 3, 2006.

(51) Int. Cl.
*F21V 21/14* (2006.01)
(52) U.S. Cl. .......... 362/190; 362/191; 362/187
(58) Field of Classification Search ............. 362/190, 362/191, 197, 198, 199, 208, 194, 187, 188, 362/293
See application file for complete search history.

(56) References Cited

U.S. PATENT DOCUMENTS

| | | | | | |
|---|---|---|---|---|---|
| 4,096,552 | A | * | 6/1978 | Ben-Porat | 362/104 |
| 5,276,596 | A | * | 1/1994 | Krenzel | 362/191 |
| 5,806,964 | A | * | 9/1998 | Maglica | 362/203 |
| 6,749,166 | B2 | * | 6/2004 | Valentine et al. | 248/309.1 |
| 2002/0167806 | A1 | * | 11/2002 | Thaxton | 362/191 |
| 2008/0232097 | A1 | * | 9/2008 | Gandhi et al. | 362/191 |

* cited by examiner

*Primary Examiner* — Laura Tso
(74) *Attorney, Agent, or Firm* — Michael A. Guth

(57) ABSTRACT

A light and support structure apparatus, wherein the light may have beam width adjustment such that the beam may be easily adjusted from a wide beam to more of a spot beam. The light may also be able to switch to a different color beam. The light may utilize standard cylindrical batteries which are inserted into a battery compartment side by side with their positive and negative ends in the same orientation. The light may be mounted upon a tripod or a monopod, and in some embodiments a tripod with flexible legs utilizing ball and socket joint connectors which, when interconnected, form a flexible assembly. Each connector may include a body with a first and second end portion. An external socket engaging surface is provided at one end of the body. The other end of the body has an internal cavity. The socket engaging surface of one connector is snapped into the internal cavity of another to interconnect the connectors. In some embodiments, the ball and socket joint connectors utilize an over-molded strip around the outside of the connector to facilitate in their use for gripping.

17 Claims, 27 Drawing Sheets

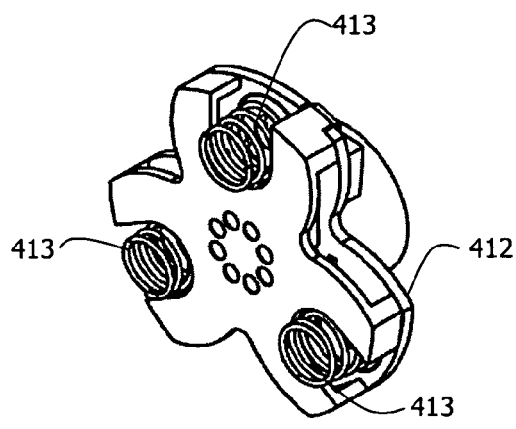
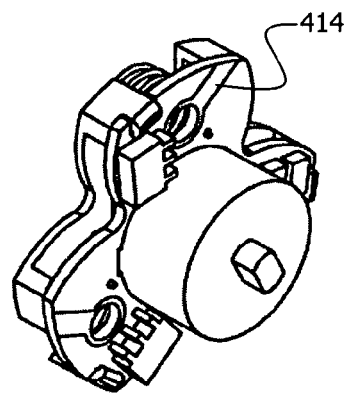
FIGURE 10A
FIGURE 10B
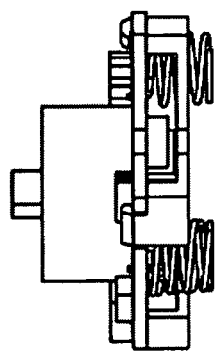
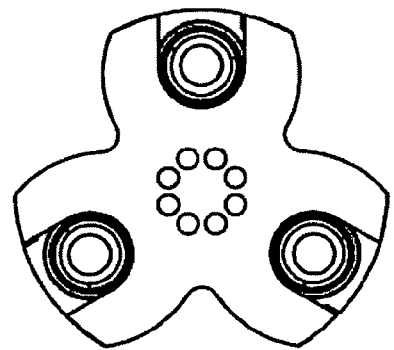
FIGURE 10C
FIGURE 10D

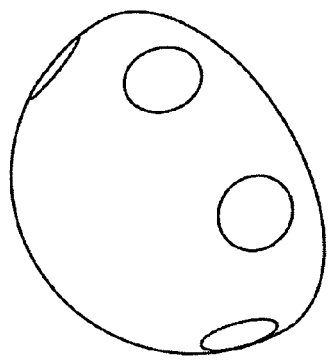
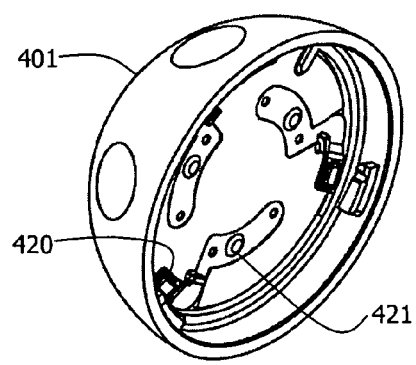
FIGURE 11A
FIGURE 11B
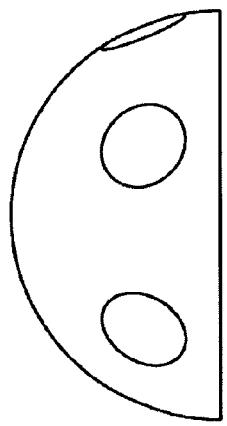
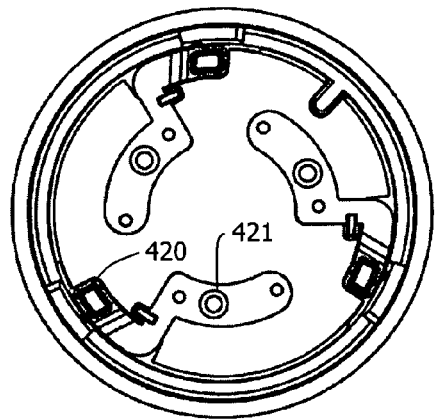
FIGURE 11C
FIGURE 11D

FLASHLIGHT WITH MOUNTING APPARATUS

CROSS-REFERENCE TO RELATED APPLICATIONS

This application is a continuation in part of U.S. patent application Ser. No. 11/637,611 to Bevirt, filed Dec. 12, 2006, which is a continuation in part of U.S. patent application Ser. No. 11/324,994 to Bevirt, filed Jan. 3, 2006, which is hereby incorporated by reference in its entirety.

BACKGROUND

1. Field of the Invention

The present invention relates to lighting, and more specifically to a light that is supported with a tripod or other flexible support apparatus.

2. Description of Related Art

Mounting devices may come in a variety of forms. Some mounting devices are used to mount various types of hardware to a variety of types of structure. Tripod structures may be used to mount devices.

Typical tripod assemblies consist of three rigid legs which are splayed out to form a support structure for devices such as cameras. The legs are usually rigid and adapted to provide support off of the ground or other flat surface. Some tripods have some adjustment to leg length which may allow for some deviation from flatness in the surface upon which they are mounted.

What is called for is a light supported by a mounting apparatus that may function as a tripod and also as a grip mount for the mounting to vertical members. What is also called for is a light that has improvements relating to beam width adjustment, battery positioning, and color adjustment.

SUMMARY

The present invention is directed to a light and support structure apparatus. The light may have beam width adjustment such that the beam may be easily adjusted from a wide beam to more of a spot beam. The light may also be able to switch to a different color beam. The light may utilize standard cylindrical batteries which are inserted into a battery compartment side by side with their positive and negative ends in the same orientation.

The light may be mounted upon a tripod or a monopod, and in some embodiments a tripod with flexible legs utilizing ball and socket joint connectors which, when interconnected, form a flexible assembly. Each connector includes a body with a first and second end portion. An external socket engaging surface is provided at one end of the body. The other end of the body has an internal cavity. The socket engaging surface of one connector is snapped into the internal cavity of another to interconnect the connectors. In some embodiments, the ball and socket joint connectors utilize an overmolded strip around the outside of the connector to facilitate in their use for gripping.

BRIEF DESCRIPTION OF THE DRAWINGS

FIGS. 10A-D are views of a battery base assembly according to some embodiments of the present invention.

FIG. 11-D are views of a battery cap assembly according to some embodiments of the present invention.

DETAILED DESCRIPTION

Figure 1:
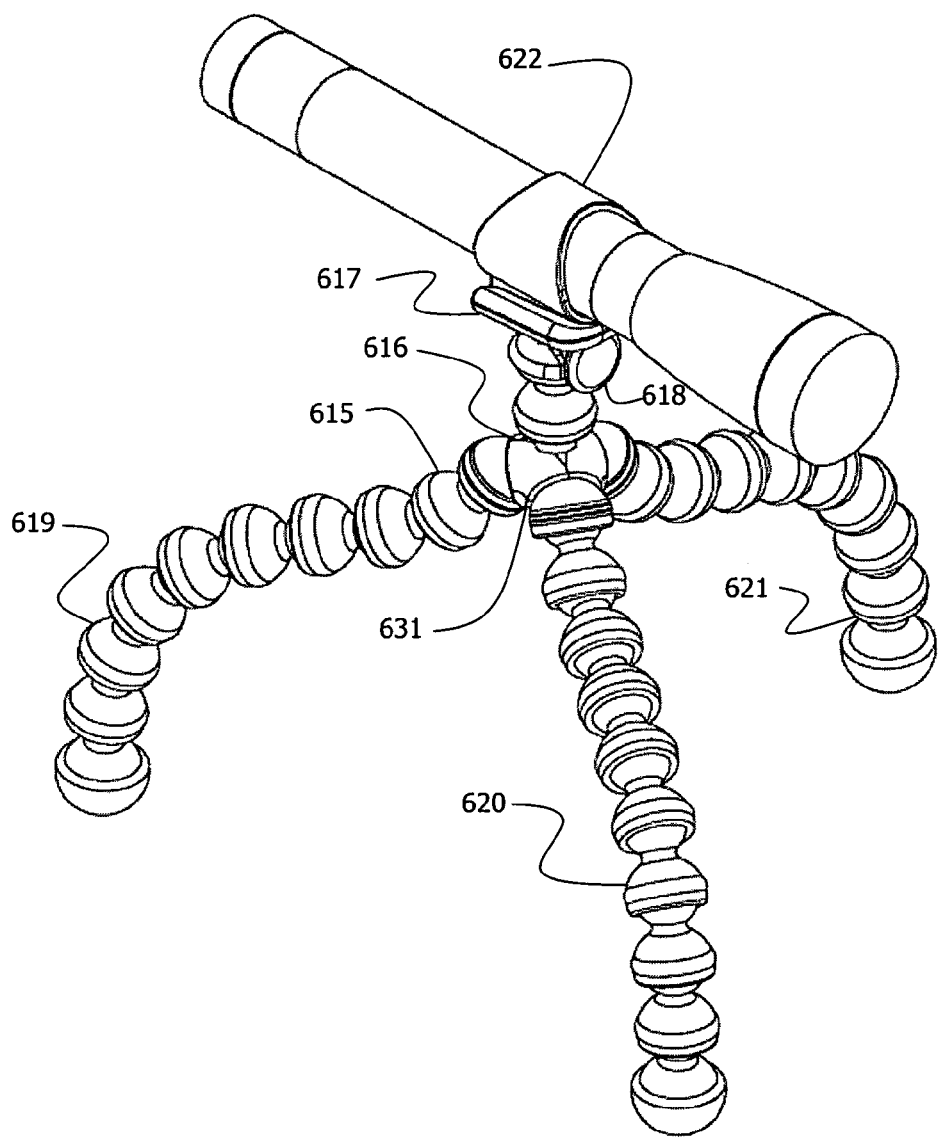
FIG. 1 is a view of a tripod and an annular clip with a flashlight according to some embodiments of the present invention.
Figure 2:
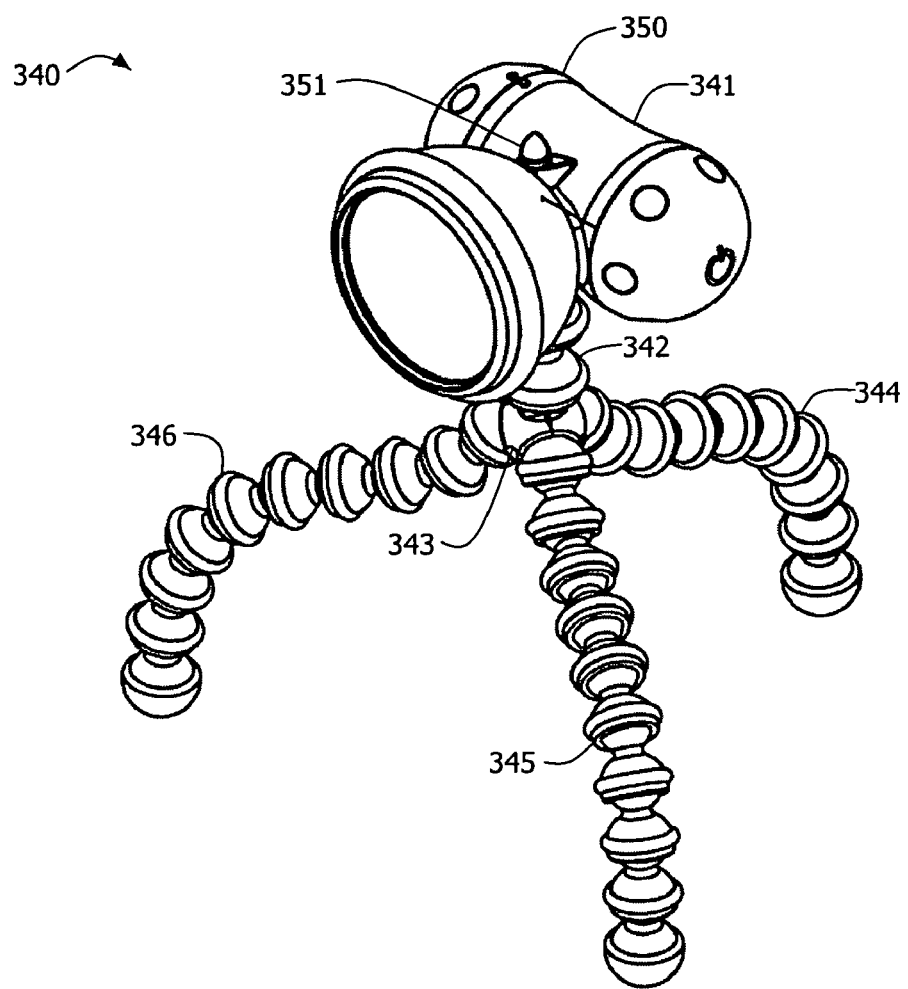
FIG. 2 is a perspective view of a tripod and light apparatus according to some embodiments of the present invention.
Figure 3A:
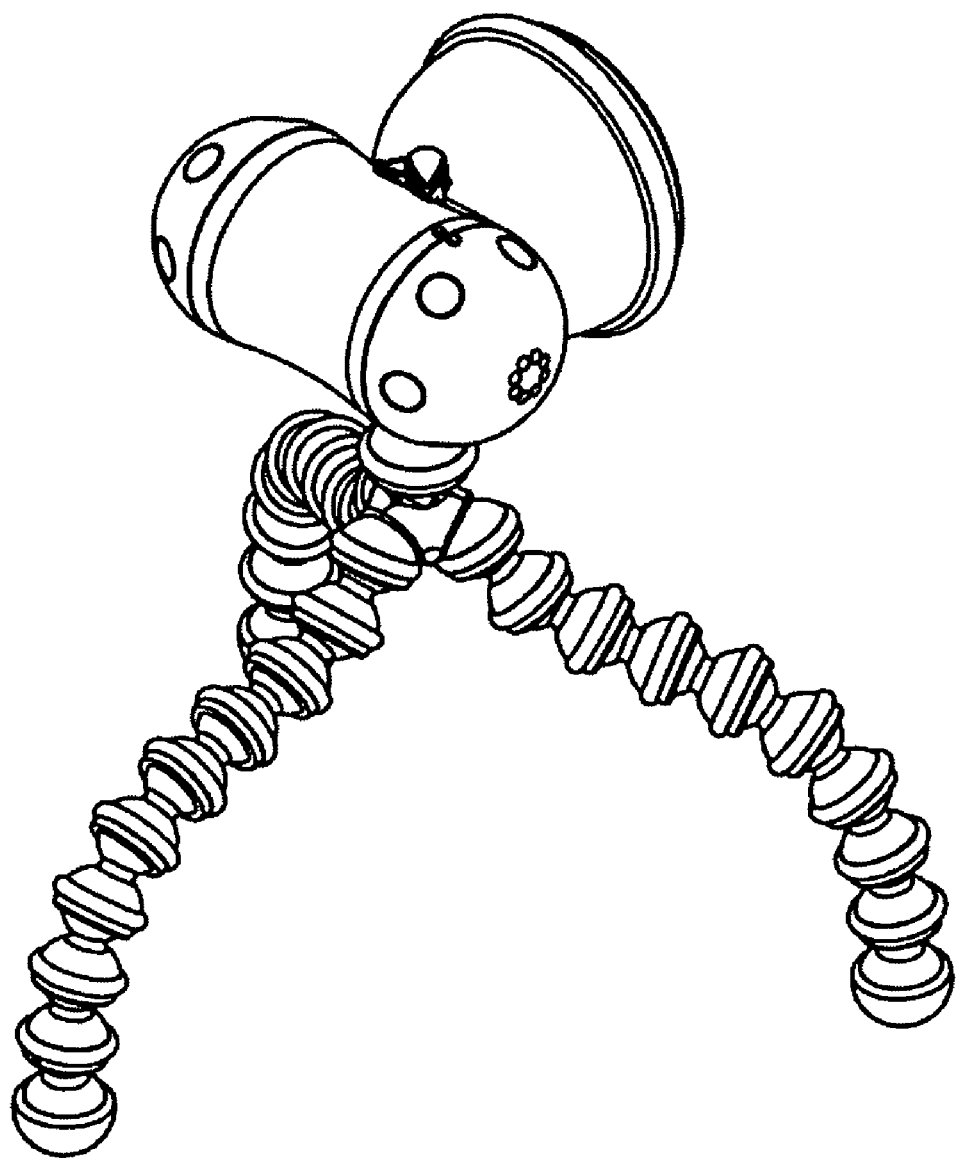
FIGS. 3A-E are views of a tripod and light apparatus according to some embodiments of the present invention.
Figure 3B:
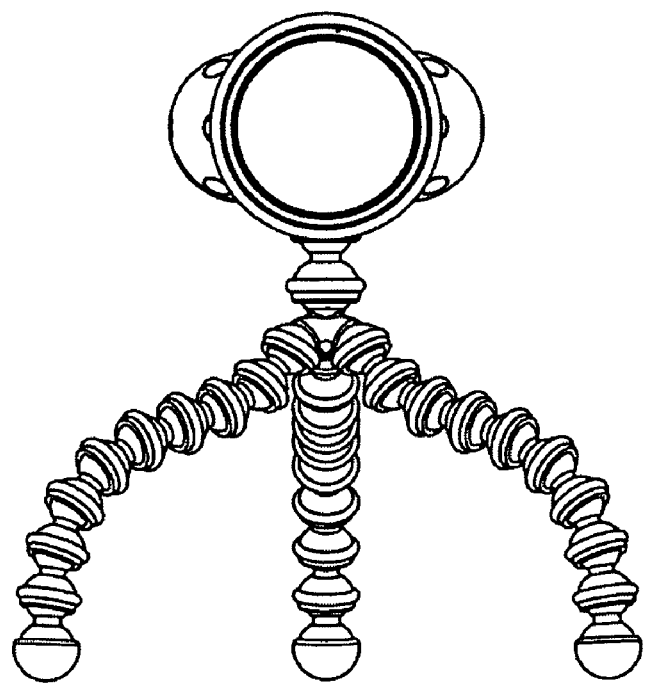
Figure 3C:
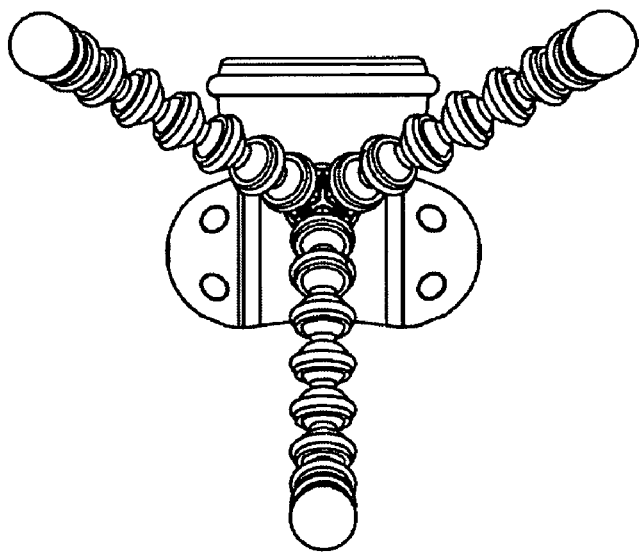
Figure 3D:
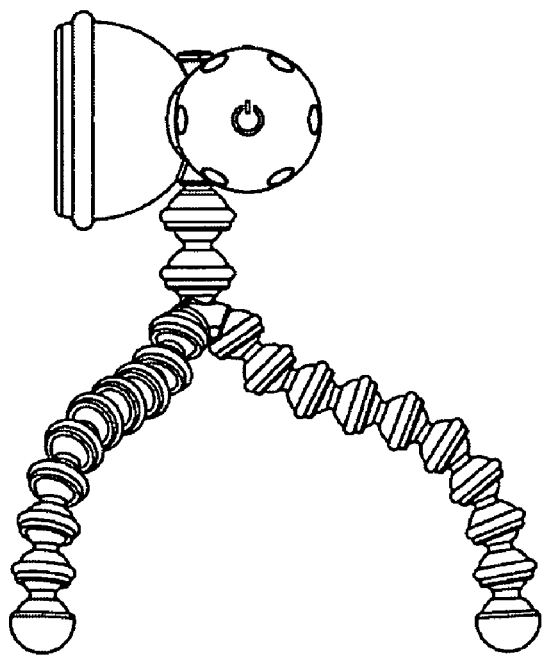
Figure 3E:
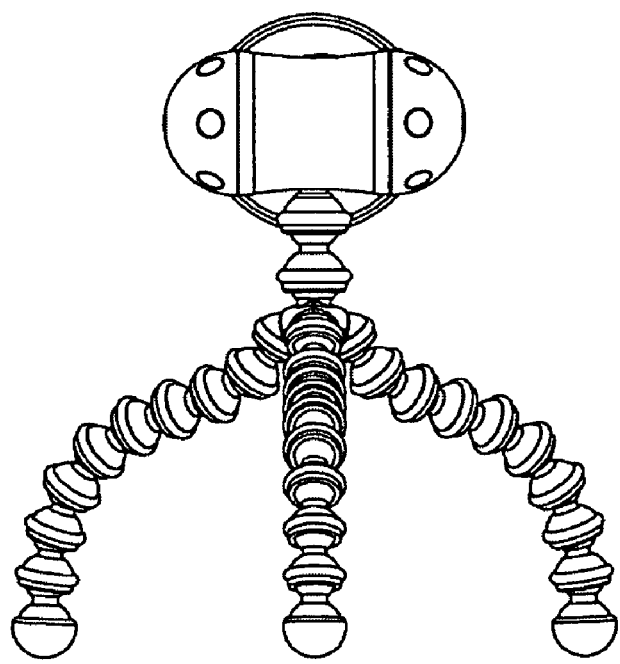

FIG. 1 is a sketch of a tripod and a flashlight inserted into a clip that is removable from the tripod. The flashlight and clip assembly 622 are seen attached to a tripod 631. The flashlight and clip assembly 622 is adapted to be attached into the tripod's interconnect portion 617. A release lever 618 allows for the release of the clip from the interconnect portion of the tripod. The release lever may release a tab that catches within the slot 609 on the bottom of the clip. The main body 616 of the tripod is seen with three flexible legs 619, 620, 621 according to some embodiments of the present invention. The flexible nature of the legs allow the tripod to also be used for gripping to vertical members by wrapping around them.

In some embodiments of the present invention, as seen in FIGS. 2 and 3A-E, a tripod and light assembly 340 uses a plurality of flexible legs 344, 345, 346 to support a light 350. The plurality of flexible legs 344, 345, 346 may be connected to a main body 343 adapted to receive the legs. In some embodiments, the flexible legs 344, 345, 346 are made up of ball and socket connectors. The connectors may each have a ball and a socket, or may staggered such that a single connector may have a socket on each end, or a ball on each end.

Figure 28:
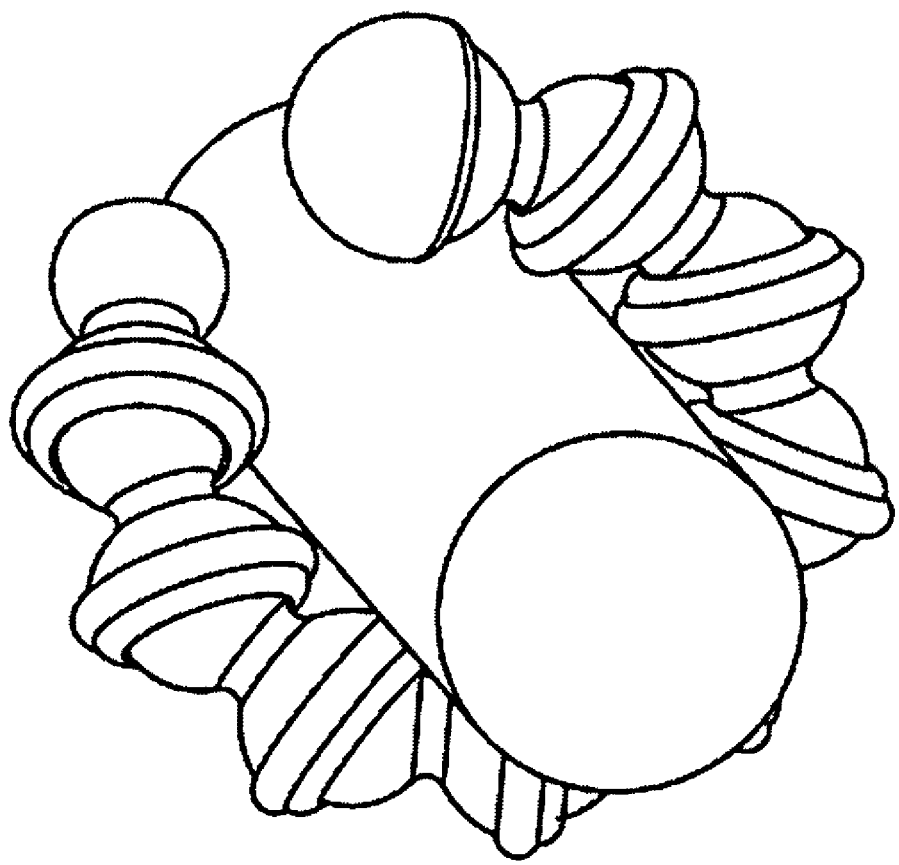
FIG. 28 is a sketch of flexible leg wrapped around a member according to some embodiments of the present invention.

In some embodiments, the light 350 may be attached to the main body 343 with a flexible or pivotable connection, which may be a ball and socket joint 342. The ball and socket joints may have a gripping ring around their exterior adapted to provide a better hold when the flexible legs are used to wrap around an object, such as pole. The gripping ring may be of a rubberized material or other material adapted to provide grip. FIG. 28 illustrates a leg a flexible leg using ball and socket connectors with a gripping ring on the exterior wrapped around a member which illustrates a way in which the tripod legs may be used.

In some embodiments, the flexible legs may have a gripping pod 348 on their ends to enhance the grip of the tripod when placed on a sloping surface, for example. In some embodiments, the ends of the flexible legs may also include magnets, which may be within the gripping pods. Thus, the tripod may be used as a traditional tripod, or may take advantage of its flexible legs to be used on an uneven surface, or may be used with the legs wrapped around members to use the tripod as a support member, or may utilize magnets on the legs for support against metallic surfaces, or may be used in other ways.

In some embodiments, the tripod and light assembly is adapted to have the width of its beam varied. For example, the light beam from the light may be adjusted from a wider beam pattern to a narrower spot beam pattern. In some embodiments, the tripod and light assembly is adapted to be powered with a plurality of cylindrical batteries, and the light is adapted to receive the batteries in the same orientation. Thus, the negative end of each of the batteries may be inserted into the battery compartment, for example, thus avoiding any patterning of battery insertion.

Figure 4:
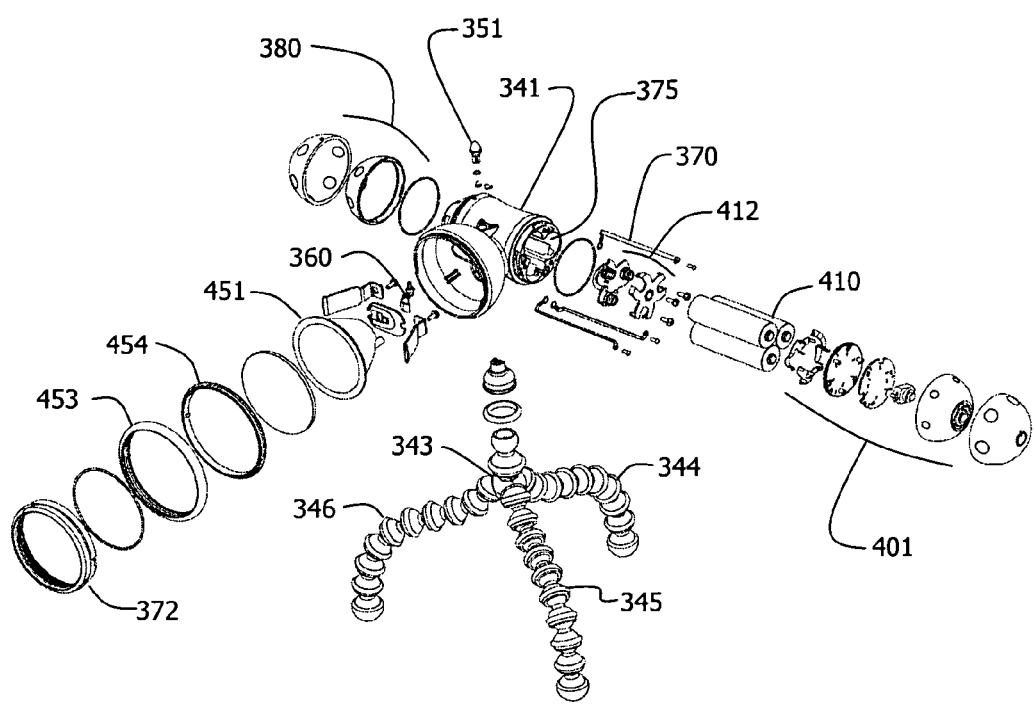
FIG. 4 is an exploded view of a tripod and light apparatus according to some embodiments of the present invention.

As seen in exploded view in FIG. 4, three flexible legs 344, 345, 346 are attached to a main body 343. A flexible joint 342 attaches the main body 343 to the main housing 341 of the light. The main housing 341 of the light is adapted to receive a plurality of batteries 410 in a battery compartment 375. A battery cap assembly 401 is adapted to be fastened to the main housing 341 and captures the batteries 410 therein. The battery base assembly 412 is adapted to be placed at the bottom of the battery compartment 375. Jumpers 370 are used to route electrical power to the battery cap assembly 401 such that the batteries 410 may all be placed within the battery compartment 375 in the same orientation, such as negative end in first.

A color switch 351 is mounted within the main housing 341 and is adapted to rotate a color tab 360. The switching of the color switch 351 changes the output color of the light. For example, the light may have a white light LED that is the color shone through the lens 451 when the color switch is in a first position. The color tab 360 may be a red material that is interspersed between the LED and the lens 451 when the color switch is in a second position.

The beam width adjustment may be accomplished with a pair of mating pieces 372, 454 which are in place in the front of the LED. The lens 451 is adapted to be positioned closer to or farther from the LED, thus adjusting the beam width, as the mating pieces are rotated relative to each other. A grip ring 453 may be rotated such that it rotates one part 372 of the mating pieces, which may have a first thread. The lens may be mounted into the other of the mating pieces 454, which may have a second thread, and the rotation of the grip ring 453 may thus cause linear motion of the lens either closer to or farther away from the LED.

The light may be powered on and off by the rotation of the power end cap assembly 380. The light may be adapted to operate at a variety of power levels.

Figures 5, 6:
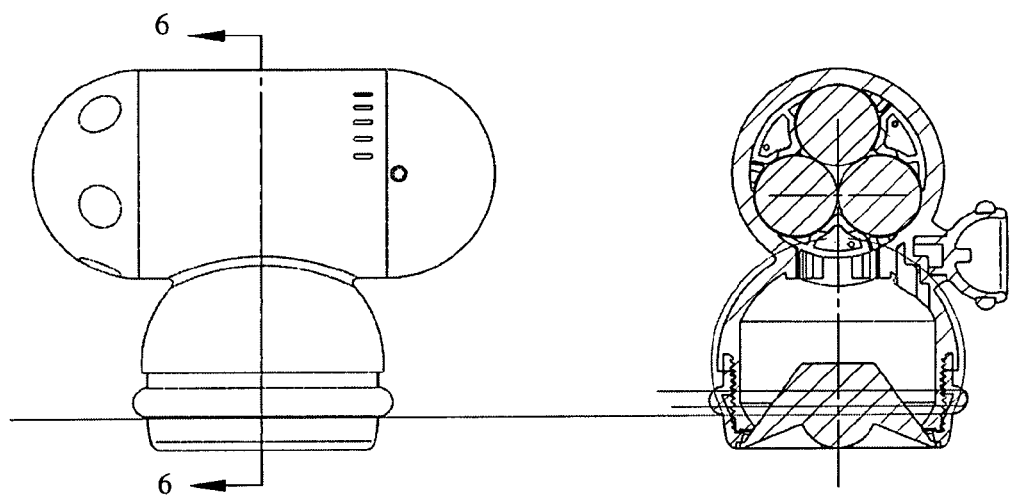
FIG. 5 is a top view of a light according to some embodiments of the present invention.
FIG. 6 is a cross-sectional view of a light according to some embodiments of the present invention.

FIGS. 5 and 6 illustrate an example of a cross sectional view of the light according to some embodiments of the present invention. On a first end of the light is the battery cap assembly, and on a second end is the power end cap assembly. As seen in the cross sectional view, the lens is mounted with a threaded assembly adapted to move the lens along the rotation axis. Also seen is a socket connector adapted to provide a flexible attachment to the main body of the tripod assembly.

Figure 7:
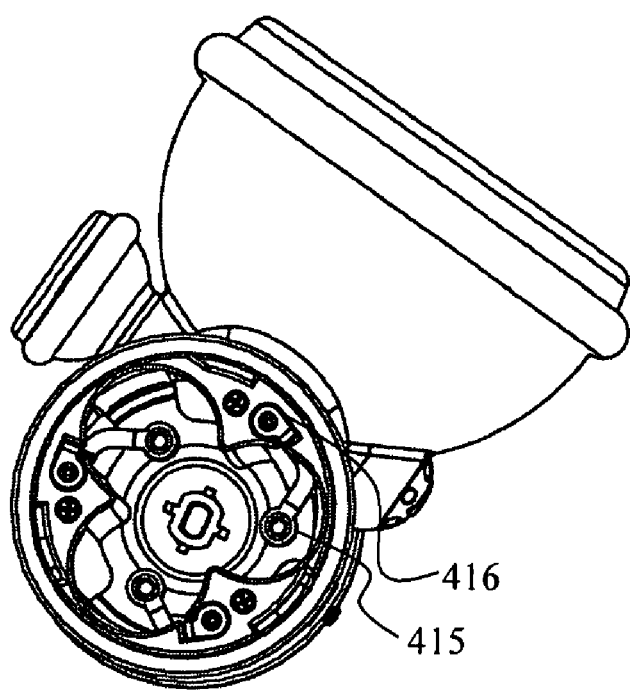
FIG. 7 is a view of a battery compartment of a light according to some embodiments of the present invention.
Figure 8:
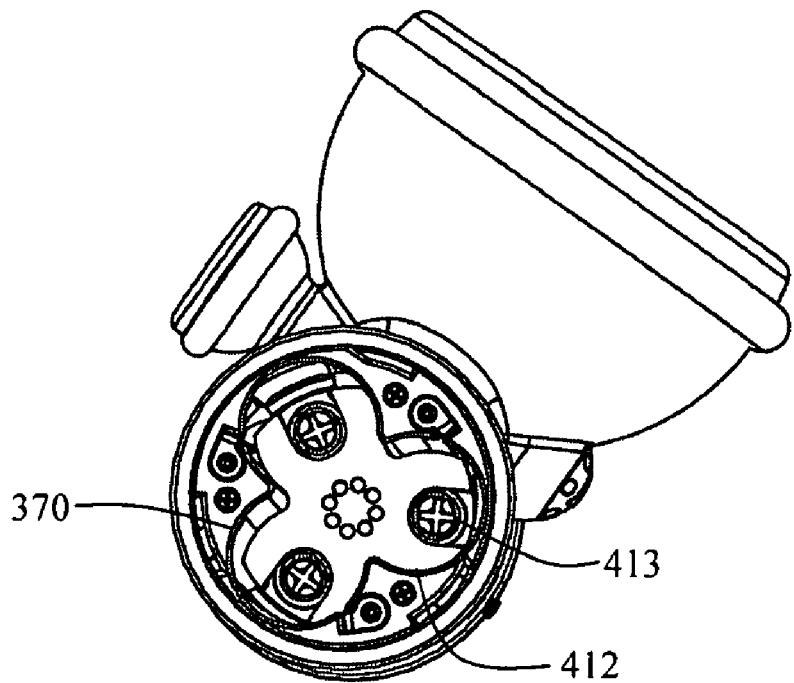
FIG. 8 is a view of a battery compartment of a light according to some embodiments of the present invention.

FIGS. 7 and 8 illustrate the battery compartment 375 both with and without the battery base assembly 412 installed. As seen in FIG. 7, a plurality of jumpers 370 have a first end 416 at the top of the battery compartment. The bottom connect points 415 are adapted to connect to the battery base assembly 412, which is seen in place at the bottom of the battery compartment in FIG. 8. The battery contact springs 413 provide for electrical connection to the batteries. The positive and negative ends of each of the batteries is thus routed to the bottom of the battery compartment, where it is coordinated into a functioning circuit.

Figure 9:
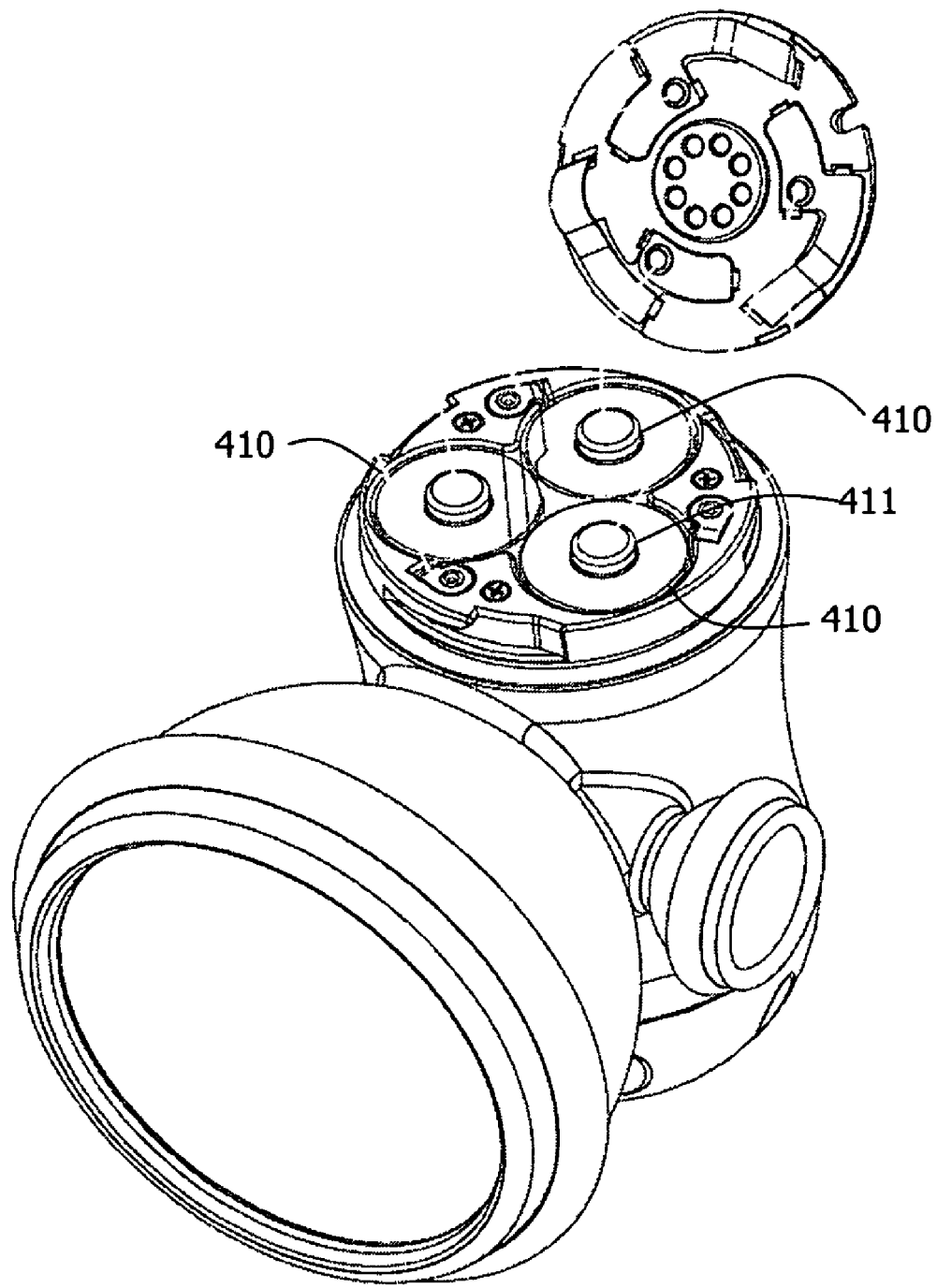
FIG. 9 is a view of a battery compartment of a light according to some embodiments of the present invention.

FIG. 9 illustrates the batteries 410 in the battery compartment with their positive ends 411 up. The inside surface of the battery cap assembly is seen with its jumpers which route the connection from the top of the battery to the top of the vertical jumpers.

FIGS. 10A-D illustrate the battery base assembly 412. Battery contact springs 413 are adapted to contact the bottom of the batteries. The power is routed out through bottom contacts 414. An anti-rotation device 492 captures the battery base assembly 412 in the bottom of the battery compartment.

FIGS. 11A-D illustrate the battery cap assembly. The battery cap assembly is adapted to mount to the main housing of the light and to capture the batteries in the battery compartment. Battery contact points 421 contact the batteries and route power to the jumper contact points 420 which contact the vertical jumpers.

Figure 12A:
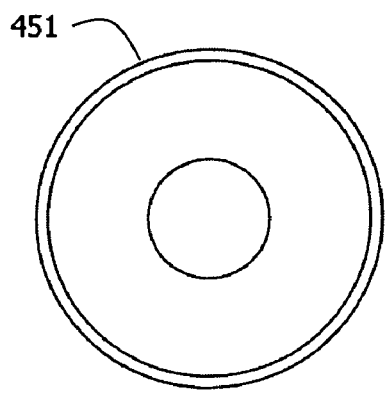
FIGS. 12A-C are views of a lens according to some embodiments of the present invention.
Figure 12B:
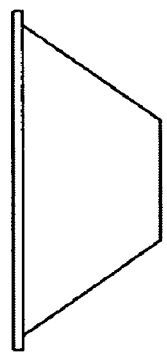
Figure 12:
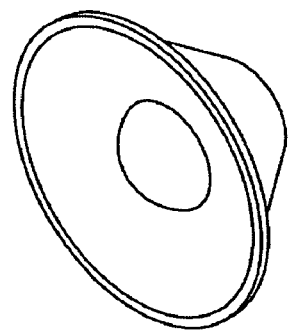

FIGS. 12A-C illustrate a glass lens that may be used in some embodiments of the light.

Figure 13:
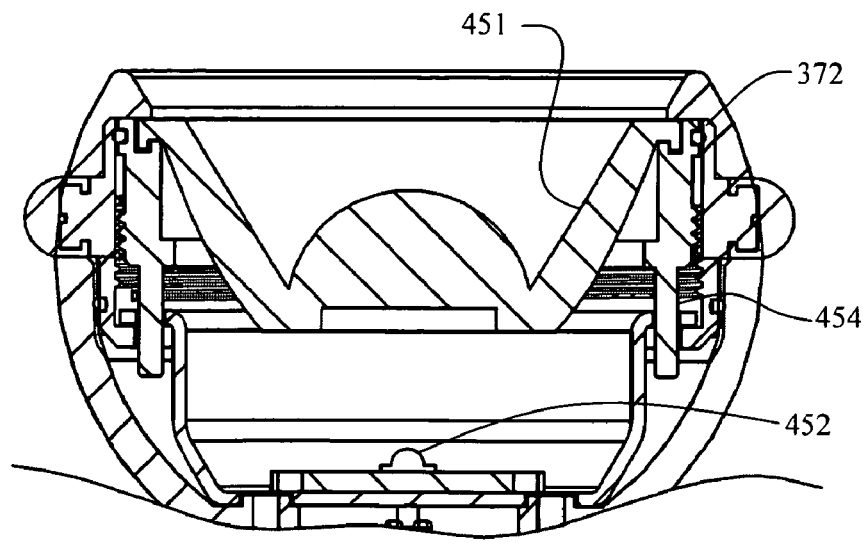
FIG. 13 is a cross-sectional view of a lens adjustment portion according to some embodiments of the present invention.

In some embodiments of the present invention, as seen in FIG. 13, an LED 452 is used to provide an adjustable width beam. The lens 451 is adapted to be moved closer or further from the LED 452 as the grip ring 453 is rotated by the user. Rotation of the grip ring 453 rotates the first threaded portion 372 to which the ring 453 is attached. The rotation causes linear motion of the second threaded portion 454 along the rotation axis, as the second threaded portion is constrained from rotation but not from some linear translation. The linear motion of the second threaded portion 454 in turn moves the lens 451 to which it is attached. The movement of the lens closer to or further from the LED 452 alters the beam width. A reflector 455 may be used to further concentrate the light into the lens 451. In some embodiments, the closer the LED is to the lens the wider the beam will be when exiting the light.

Figure 14:
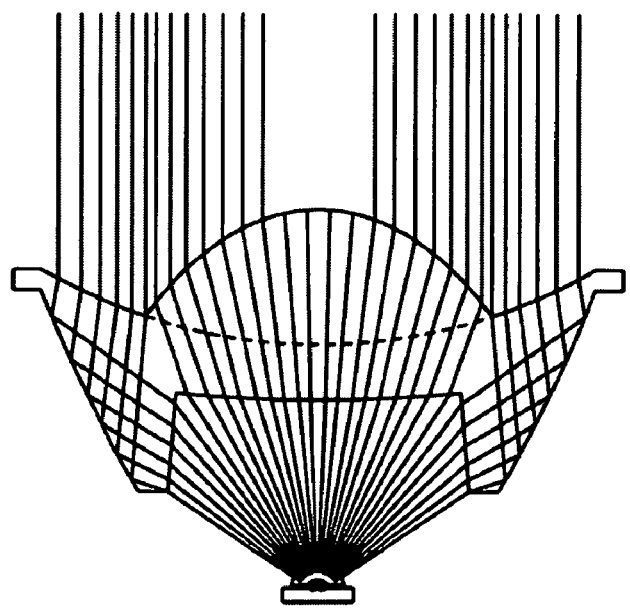
FIG. 14 is sketch of a light path according to some embodiments of the present invention.
Figure 15A:
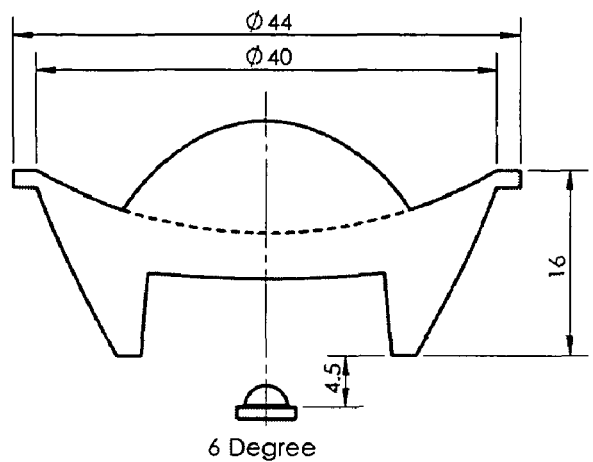
FIG. 15-C are views of a lens and LED according to some embodiments of the present invention.
Figure 15B:
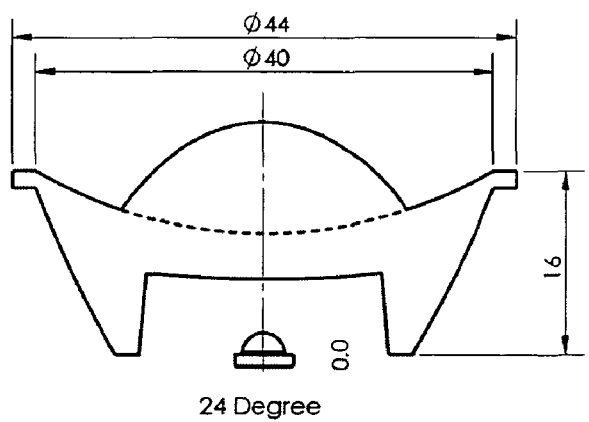
Figure 15C:
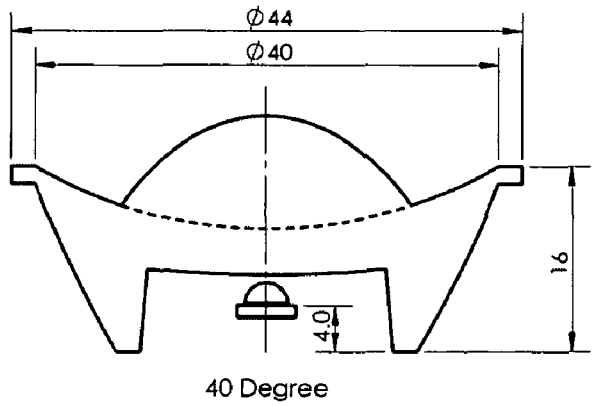

FIG. 14 illustrates the light path through the lens from the LED. The breadth of the exiting light path is a function of the distance from the LED to the lens. As seen in FIGS. 15A-C, the different distances yield different angles of beams from the lens.

Figure 16:
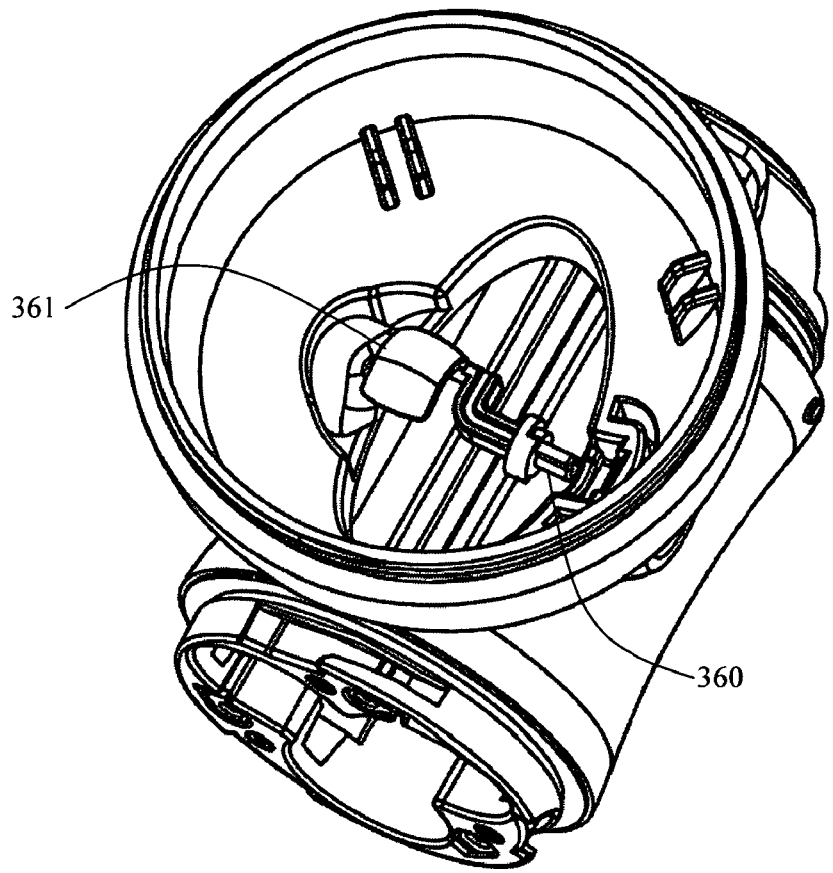
FIG. 16 is a top perspective view of a color switching portion according to some embodiments of the present invention.
Figure 17:
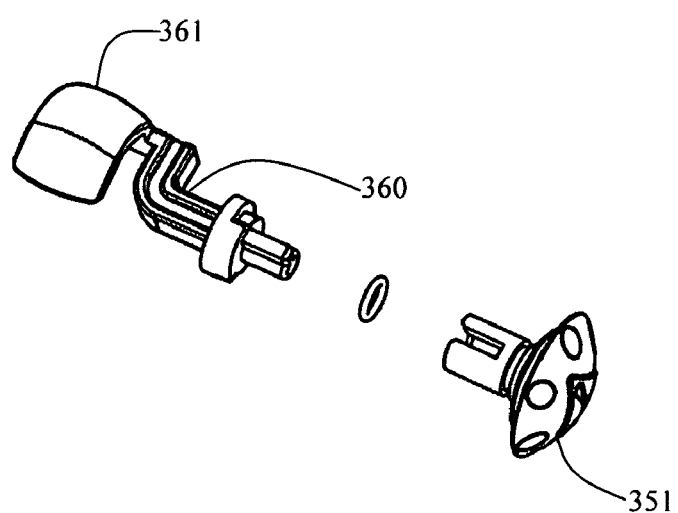
FIG. 17 is a perspective view of a color tab and switch according to some embodiments of the present invention.

FIGS. 15 and 16 illustrate an aspect of the light that allows for change of color of the exiting beam in some embodiments. The color switch 351 on the outside of the light housing is adapted to switch into place a color tab 361 between the LED and the lens. In some embodiments, the color tab 361 is of a polycarbonate material. The color switch 351 may be connected to a color lever 360, which is connected to the color tab 361.

Figure 29:
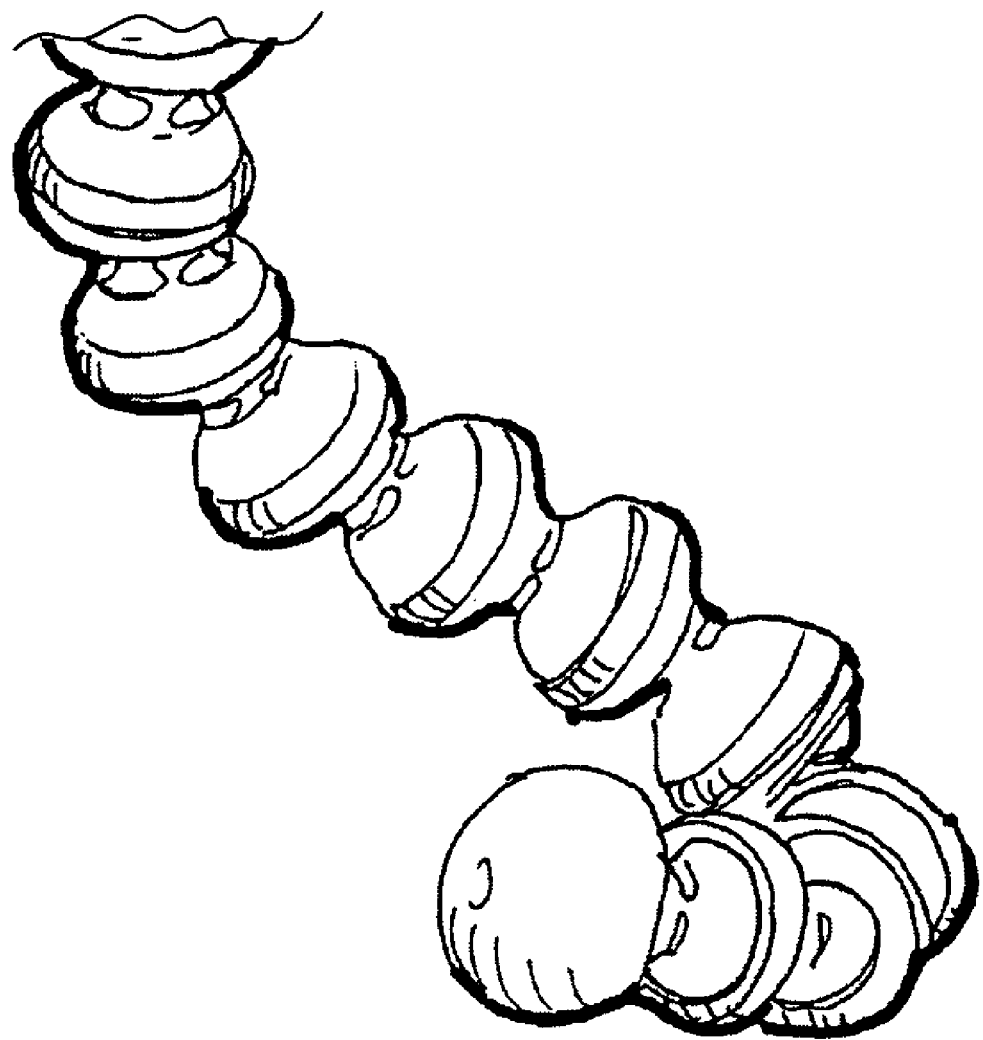
FIG. 29 is a sketch of a monopod mounting apparatus according to some embodiments of the present invention.

FIG. 29 illustrates a monopod, or unipod, that may have a light mounted to it according to some embodiments of the present invention. A monopod is seen with a series of ball and socket connectors with an overmolded grip strip as seen in other embodiments of the present invention. The monopod may have light mounted to it according to embodiments of the present invention. The monopod allows for mounting to members, such as a vertical member.

Figure 18:
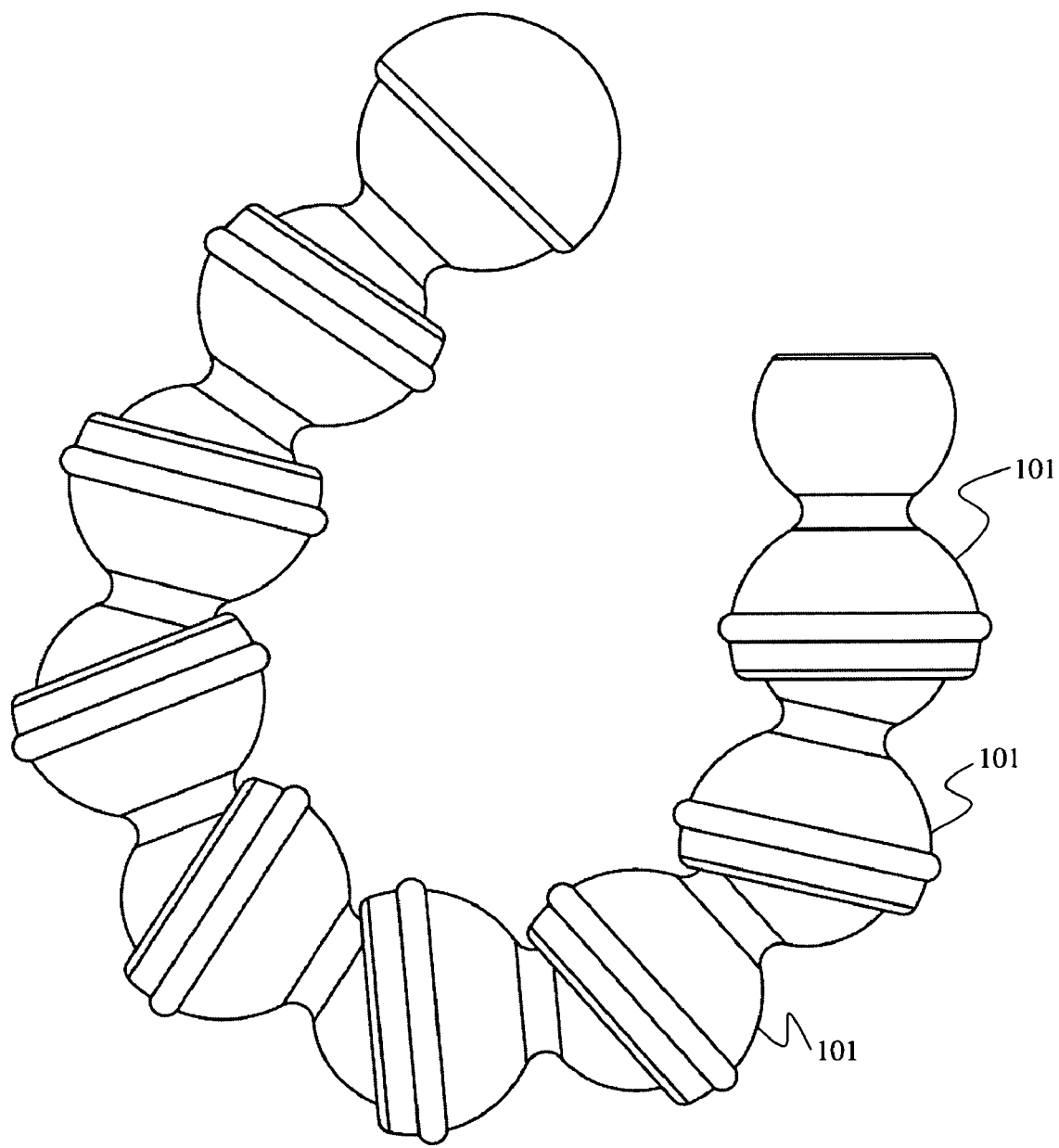
FIG. 18 illustrates a side view of a plurality of connected connectors according to some embodiments of the present invention.
Figure 19:
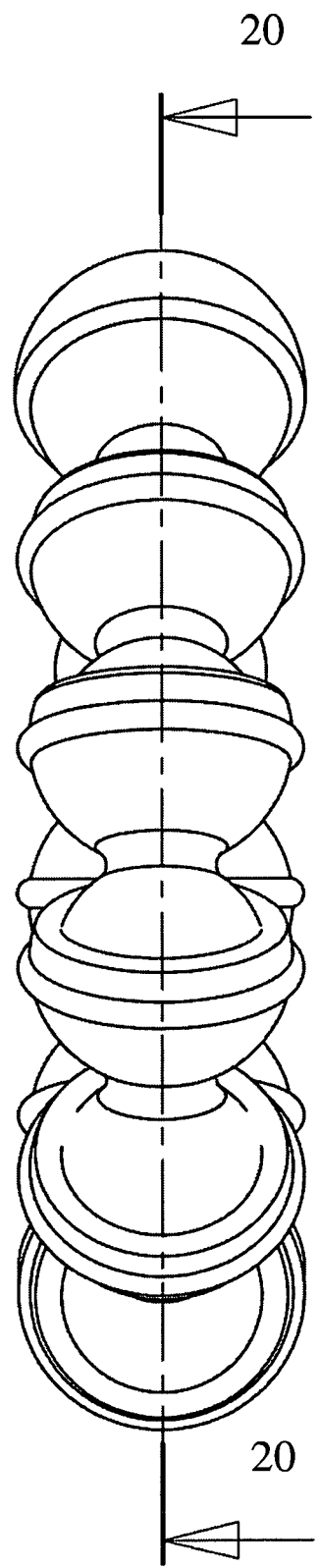
FIG. 19 illustrates an end view of a plurality of connected connectors according to some embodiments of the present invention.
Figure 20:
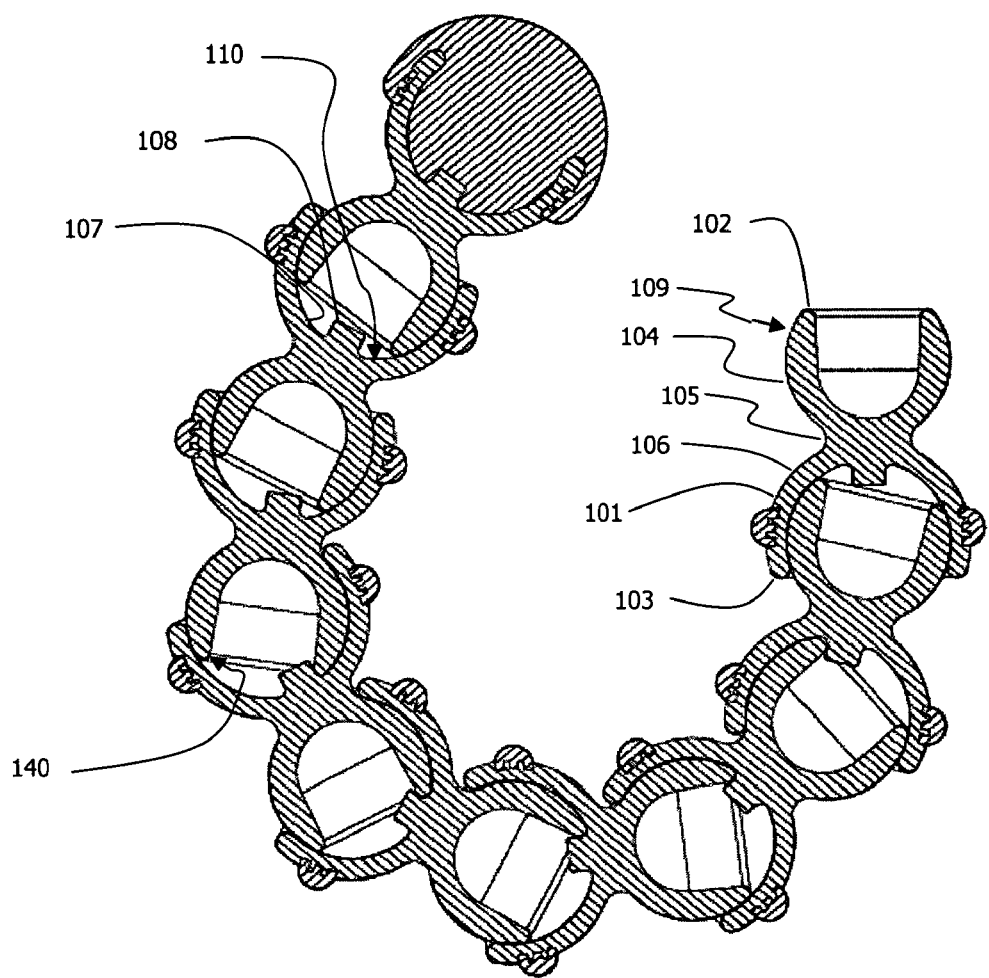
FIG. 20 is a cross-sectional view of a plurality of connected connectors according to some embodiments of the present invention.

FIGS. 18, 19, and 20 illustrate a plurality of ball and socket joint connectors 101 according to some embodiments of the present invention. A connector 101 has a first end portion 102 and a second end portion 103. A socket engaging end surface 104 is present at the first end 102. The first end portion 102 is substantially hollowed out.

The second end portion 103 has a body 106 with an internal socket receiving cavity 107. The inner surface 110 of the an internal socket receiving cavity 107 is adapted to fit over the socket engaging end surface 104 of another connector 101, or of another piece with a similar socket engaging end surface. A neckdown 105 separates the first end portion 102 from the second end portion 103. A stop nub 108 acts as a mechanical stop to prevent over angulation and possible unintentional separation of a ball and socket joint connector pair.

Figure 21:
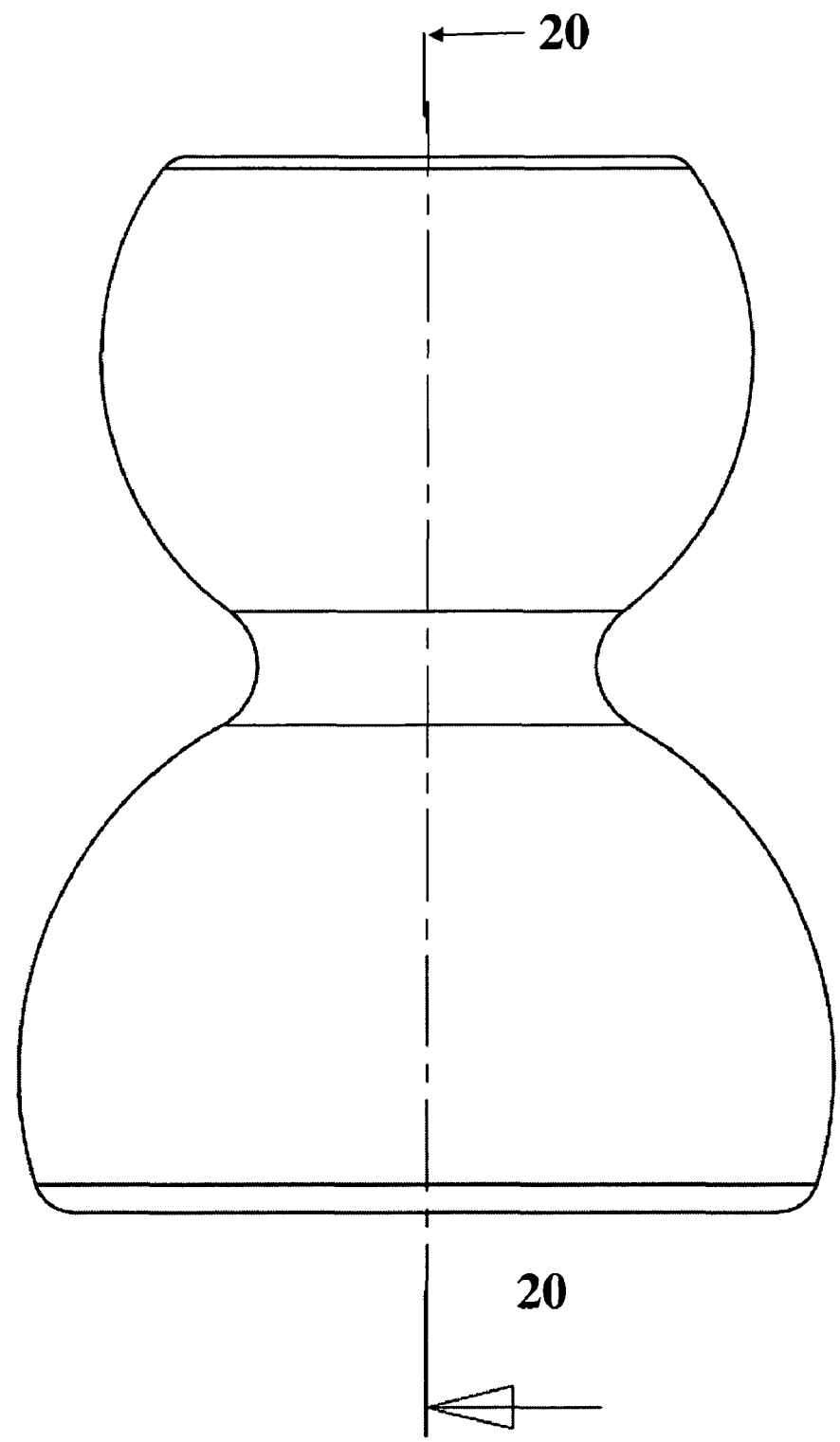
FIG. 21 is a side view of a connector according to some embodiments of the present invention.

As seen in FIG. 21, the connector 101 has a primary axis 111 in some embodiments. The connector 101 may be symmetric around the primary axis 111 in some embodiments. The end surface planes of the first and second end portions of the connector may be perpendicular to the primary axis 111 in some embodiments.

In some embodiments of the present invention, the wall thicknesses of the internal socket receiving cavity or the socket engaging end surface, or both, are constructed so that an interference fit remains after the ball and socket joint connectors are connected. In some embodiments, the interference fit is designed such that the material is stressed to a stress level below that of the plastic limit but above the creep limit. The material may then creep until the interference is at or below the creep limit, typically down to the upper end of the elastic deformation stress range of the material. In such an embodiment using a plurality of connectors connected together to form a longer chain, the stresses will tend to equalize in the different connector pairs. This equalization of stresses will tend to equalize the frictions of the various connector pairs. An equalization of the frictions in the connector pairs in a long chain of connected connectors will tend to allow the chain of connectors to bend in a smooth fashion when the chain is subjected to bending forces. For example, in a 10 unit chain bent to a 45 degree angle, the bending may be well spread among the connector pairs.

Figure 23:
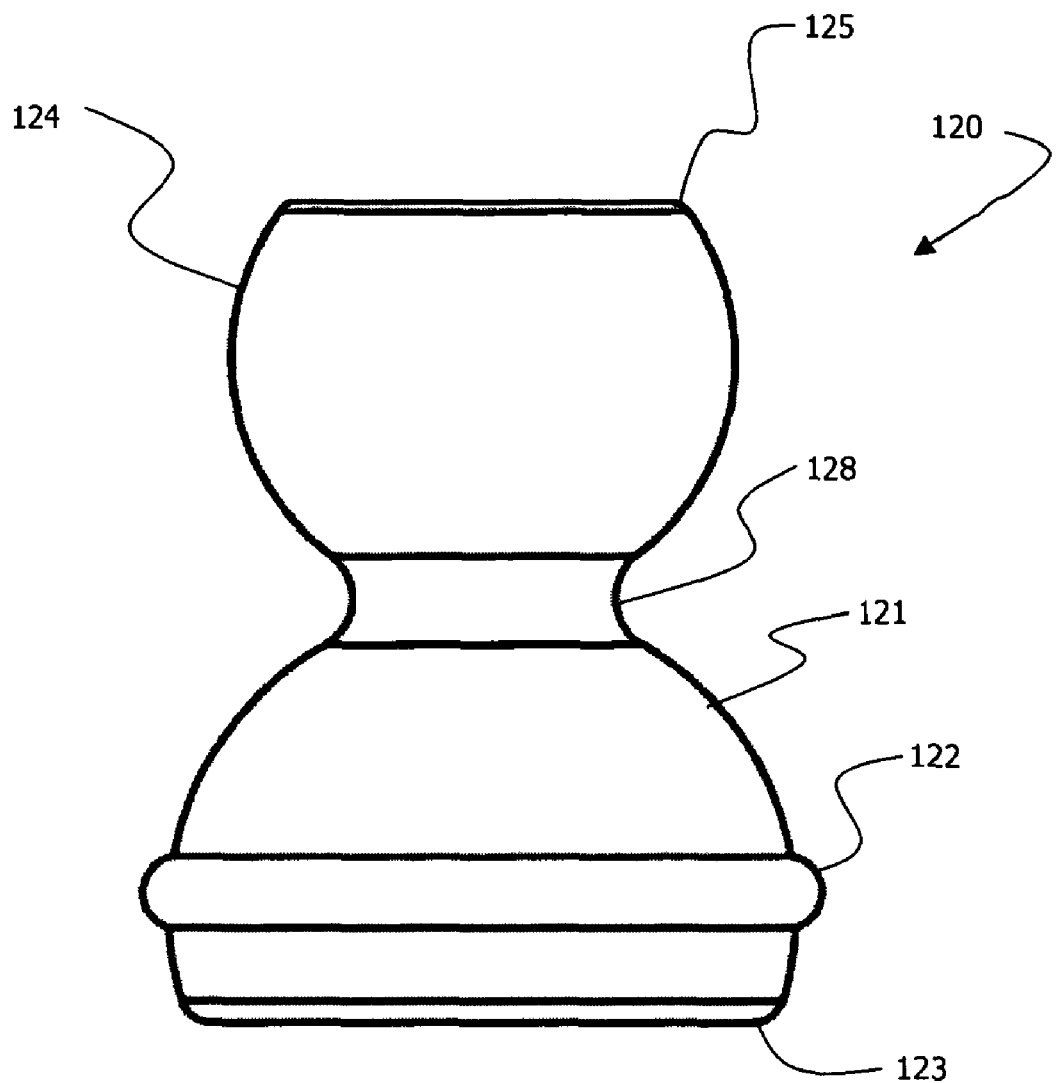
FIG. 23 is illustrates a connector with a gripping portion according to some embodiments of the present invention.
Figure 24:
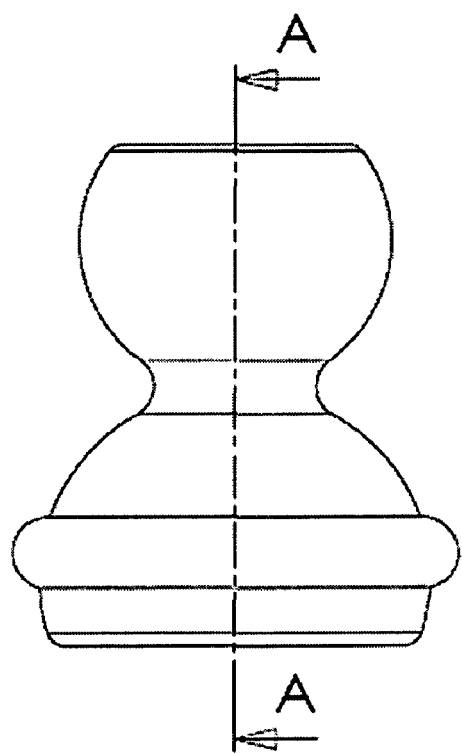
FIGS. 24 and 24A are a side and cross-sectional view of a connector with a gripping portion according to some embodiments of the present invention.
Figure 24A:
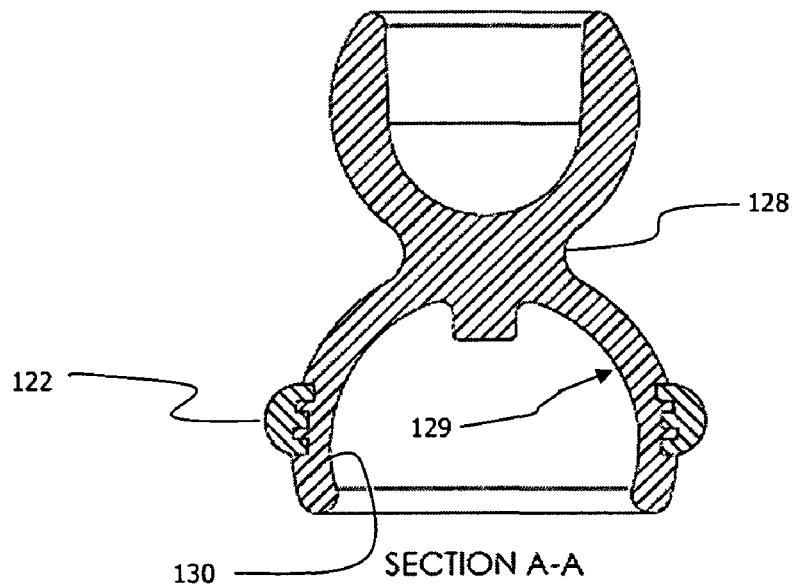

In some embodiments, as seen in FIGS. 23, 24 and 24A, a connector 120 includes a gripping portion 122. The connector 120 has a first end portion 125 and a second end portion 123. A socket engaging end surface 124 is present at the first end 125. The first end portion 125 is substantially hollowed out.

The second end 123 has a body 121 with an internal socket receiving cavity 130. The inner surface 129 of the an internal socket receiving cavity 130 is adapted to fit over the socket engaging end surface 124 of another connector, or of another piece with a similar socket engaging end surface. A neckdown 128 separates the first end portion 125 from the second end portion 123. A gripping portion 122 allows the connector to grip surfaces more readily. In some embodiments, the gripping portion is co-molded into the connector body. In some embodiments, the gripping portion is a rubberized compound. In some embodiments, the gripping portion is a circumferential ring molded into the outer surface of the connector. The gripping portion may provide a higher friction interface when the connector is set upon or wrapped around an object.

In some embodiments of the present invention, the outer surface 109 of the socket engaging end surface 104 may be lubricated. Lubrication of the outer surface 109 of the socket engaging end surface 104 may allow for more even frictions between various connections in a chain of connectors. In some embodiments, the inner surface 110 of the internal socket receiving cavity 107 may be lubricated. Lubrication of the inner surface 110 of the internal socket receiving cavity 107 may allow for more even frictions. In some embodiments, both the outer surface 109 of the socket engaging end surface 104 and the inner surface 110 of the an internal socket receiving cavity 107 may be lubricated. In some embodiments, the surfaces may be coated with an adhesive. With some connector materials, such as acetyl materials, Delrin, and Nylon, compounds normally used as adhesive may function as a lubricant when used in an interference fit ball and socket joint connector.

In some embodiments of the present invention, the outer surface 109 of the socket engaging end surface 104 may be textured. The texture may take the form of a surface roughness. Texturing of the outer surface 109 of the socket engaging end surface 104 may allow for more even frictions between various connections in a chain of connectors. In some embodiments, the inner surface 110 of the internal socket receiving cavity 107 may be textured. The texture may take the form of a surface roughness. Texturing of the inner surface 110 of the internal socket receiving cavity 107 may allow for more even frictions. In some embodiments, both the outer surface 109 of the socket engaging end surface 104 and the inner surface 110 of the an internal socket receiving cavity 107 may be lubricated.

Figure 22:
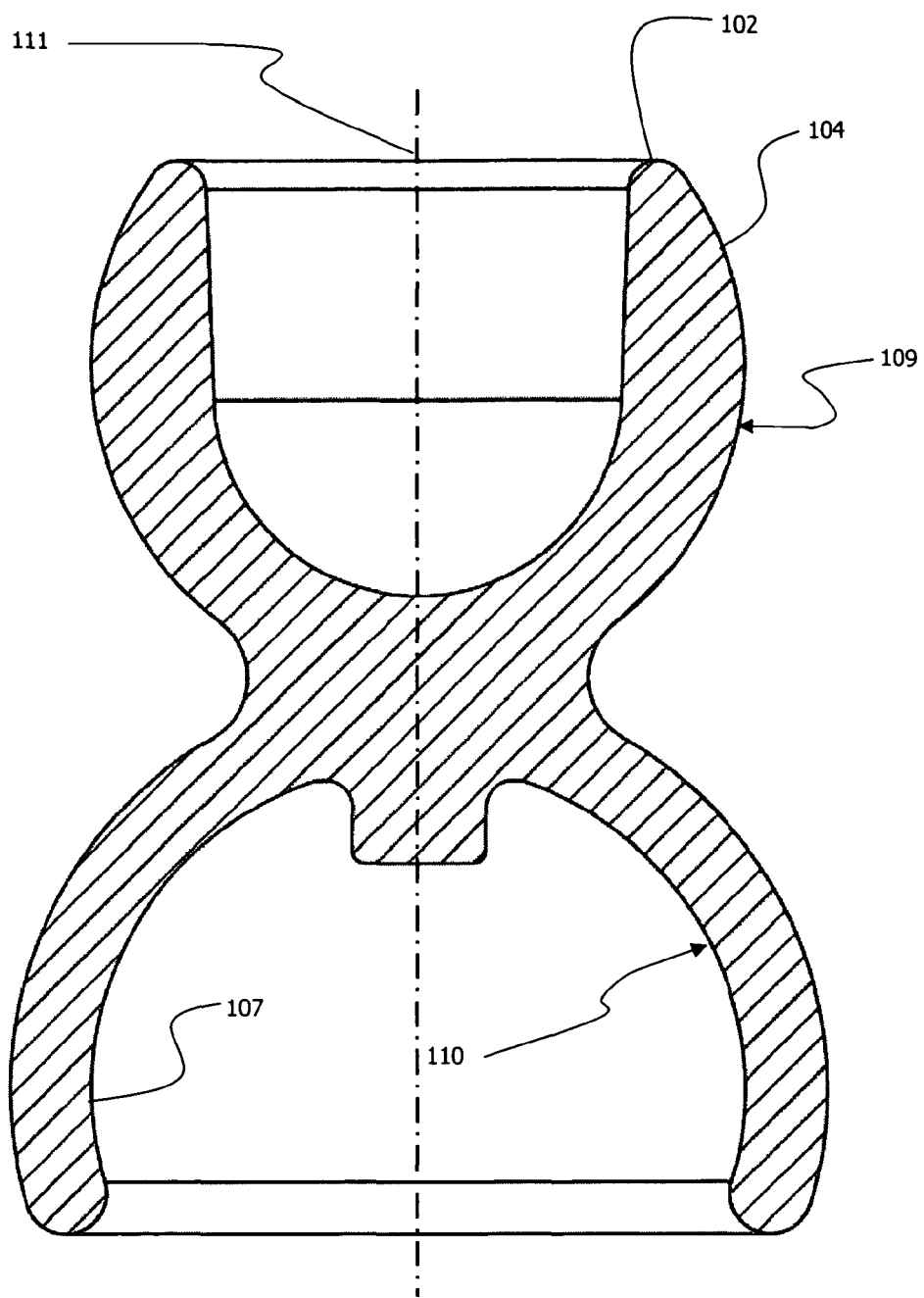
FIG. 22 is a cross-sectional view of a connector according to some embodiments of the present invention.

FIG. 22 illustrates a cross-sectional view of a plurality of ball and socket joint connectors. In some embodiments of the present invention, a stop nub 108 resides within the internal socket receiving cavity. The inner rim 140 of the socket engaging end surface 104 is adapted to contact the stop nub 108 as the two connectors reach a certain angle relative to each other. The contact of the stop nub 108 and the inner rim 140 of the socket engaging end surface 104 acts as a mechanical stop with regard to further angulation of the two pieces relative to each other. The mechanical stop function works to prevent over-rotation and possible disconnection of the two connectors.

Figure 25:
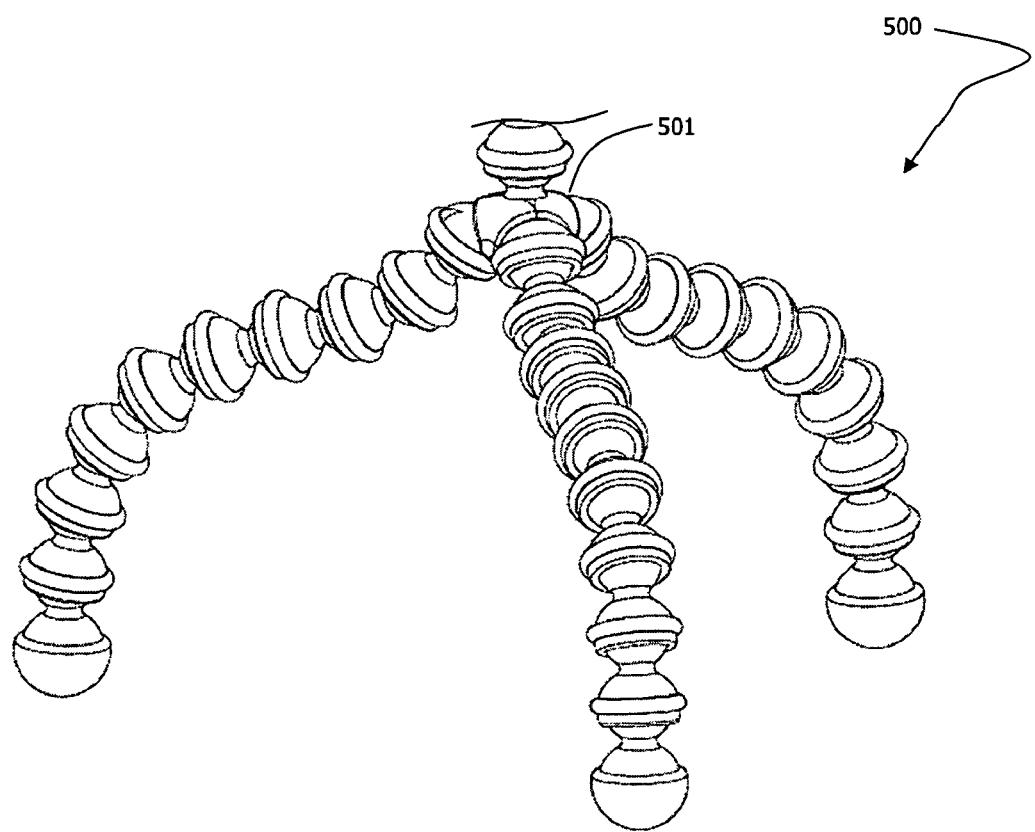
FIG. 25 is an illustration of a tripod apparatus according to some embodiments of the present invention.
Figures 26, 26A:
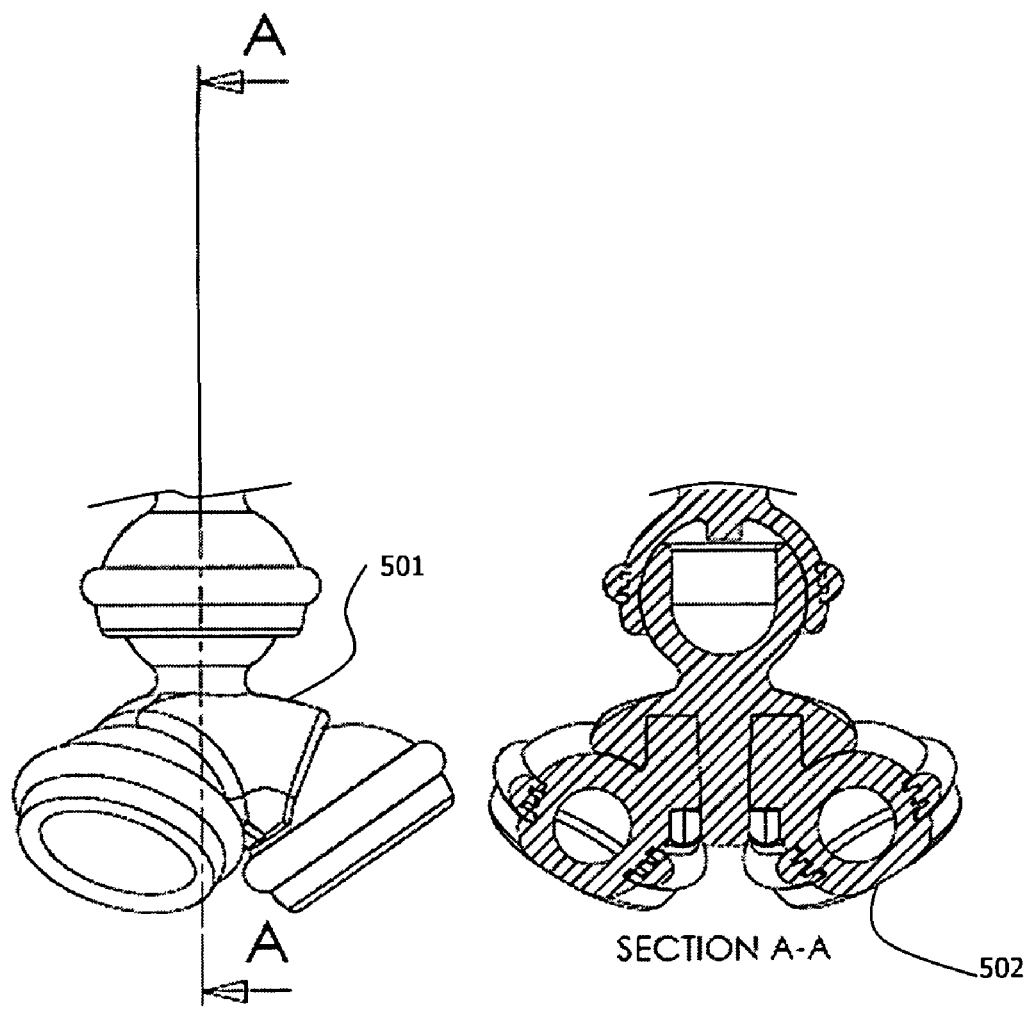
FIGS. 26 and 26A are a side and cross-sectional view of a body and interconnect portion of a tripod apparatus according to some embodiments of the present invention.
Figures 27, 27A:
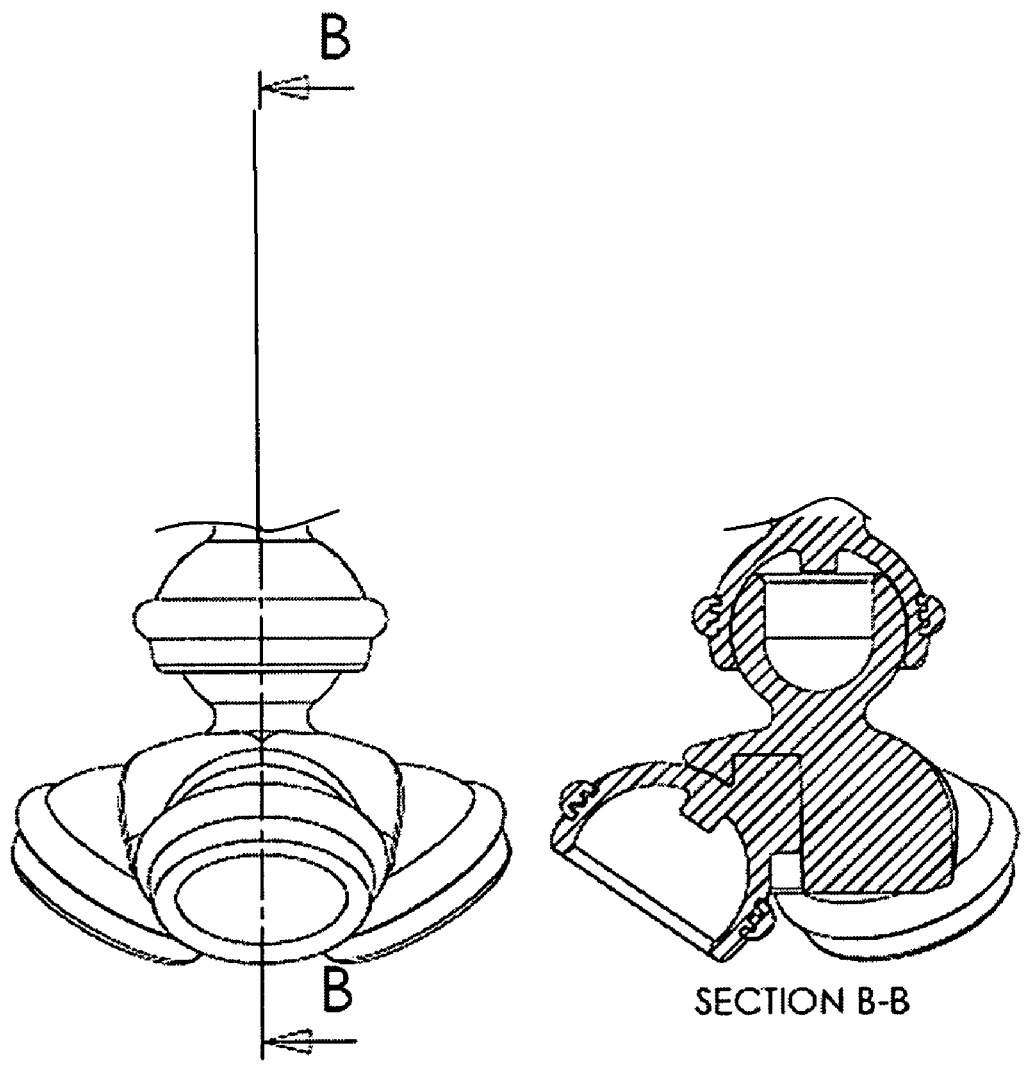
FIGS. 27 and 27A are a side and cross-sectional view of a body and interconnect portion of a tripod apparatus according to some embodiments of the present invention.

In some embodiments of the present invention, as seen in FIGS. 25, 26, and 27, a tripod apparatus 500 utilizes a body portion 501 which spaces and locates the legs of the apparatus. The spacing of the body sockets 502 allows for better use of the tripod legs as attaching arms in some uses. In some embodiments, the body sockets 502 are equally spaced around the center of the body portion 501. The body sockets are also flared at an angle relative to the ground (in typical usage). In some embodiments, the flared angle is 45 degrees. The flaring of the body sockets allows a different range of potential wrapping angles for the legs of the tripod.

With the flaring of the body sockets, the tripod legs may still be utilized as in the case of a typical tripod. The range of motion of the body sockets and the connectors which form the legs still allow for vertical positioning of the legs. Thus, the body portion 501 retains the tripod's usual functionality. The flaring, however, allows for greater bending of the legs in cases where the legs are used as gripping arms, such as when wrapped around vertical bars and the like. Thus the body portion 501 adds to the range of positions and to the types of uses that the apparatus may entertain.

As evident from the above description, a wide variety of embodiments may be configured from the description given herein and additional advantages and modifications will readily occur to those skilled in the art. The invention in its broader aspects is, therefore, not limited to the specific details and illustrative examples shown and described. Accordingly, departures from such details may be made without departing from the spirit or scope of the applicant's general invention.

I claim:

1. A tripod and light assembly, the assembly comprising:
   three flexible legs;
   a main body, each of said flexible legs attached to said body; and
   a light, said light attached to said main body, wherein said body has a central axis and three sockets, each socket having an associated opening and being arranged to pivotally receive an associated leg, wherein the socket openings are flared relative to the central axis such that they do not face in the same direction, to thereby facilitate a greater range of motion in their associated legs in a direction away from the central axis than would be possible if the openings all faced in the same direction.

2. The assembly of claim 1, wherein each of said three flexible legs is composed of a multiplicity of connector pieces that join together in ball and socket joints that permit pivotable movement between connecting ball and socket components to together provide each leg with sufficient flexibility to substantially wrap around an object.

3. The assembly of claim 2 wherein said light is attached to said main body with a pivotable connection.

4. The assembly of claim 3 wherein said light is attached to said main body with a ball and socket connection.

5. A tripod and light assembly, the assembly comprising:
   three flexible legs;
   a main body, each of said flexible legs attached to said body; and
   a light, said light attached to said main body, wherein said light comprises a battery compartment, said battery compartment comprising a bottom end, said battery compartment adapted to receive a plurality of cylindrical batteries side by side.

6. The assembly of claim 5 wherein cylindrical batteries comprise a positive end and a negative end, wherein said light is adapted to be powered when each of said batteries are placed in said battery compartment with the negative end facing said bottom end of said battery compartment.

7. The assembly of claim 5 wherein cylindrical batteries comprise a positive end and a negative end, wherein said light is adapted to be powered when each of said batteries are placed in said battery compartment with the positive end facing said bottom end of said battery compartment.

8. The assembly of claim 1 wherein said light comprises a beam width adjustment portion, said beam width adjustment portion adapted to adjust the width of the light beam of the light.

9. The assembly of claim 8 wherein said light further comprises:
   an LED;
   a lens; and
   a mechanical adjustment portion adapted to vary the distance between said LED and said lens.

10. A tripod and light assembly, the assembly comprising:
    three flexible legs;
    a main body, each of said flexible legs attached to said body; and
    a light, said light attached to said main body, wherein said light comprises:
    a beam width adjustment portion, said beam width adjustment portion adapted to adjust the width of the light beam of the light:
    a battery compartment, said battery compartment comprising a bottom end, said battery compartment adapted to receive a plurality of cylindrical batteries side by side, wherein cylindrical batteries comprise a positive end and a negative end, wherein said light is adapted to be powered when each of said batteries are placed in said battery compartment with the negative end facing said bottom end of said battery compartment.

11. The assembly of claim 10 wherein said light further comprises:
    an LED;
    a lens; and
    a mechanical adjustment portion adapted to vary the distance between said LED and said lens.

12. A tripod and light assembly, the assembly comprising:
    three flexible legs;
    a main body, each of said flexible legs attached to said body; and
    a light, said light attached to said main body, wherein said light comprises:
    a beam exit area;
    a light source; and
    a color panel, said color panel adapted to move from a first position between said light source and said beam exit area to a second position not between said light source and said beam exit area.

13. The assembly of claim 12 wherein light source is an LED.

14. The assembly of claim 13 wherein said light further comprises a lens, and wherein said first position is between said LED and said lens.

15. A tripod and light assembly, the assembly comprising:
    three flexible legs;
    a main body, each of said flexible legs attached to said body; and
    a light, said light attached to said main body, wherein said light comprises:
    a beam exit area;
    a light source; and
    a color panel, said color panel adapted to move from a first position between said light source and said beam exit area to a second position not between said light source and said beam exit area:

a battery compartment, said battery compartment comprising a bottom end, said battery compartment adapted to receive a plurality of cylindrical batteries side by side, wherein cylindrical batteries comprise a positive end and a negative end, wherein said light is adapted to be powered when each of said batteries are placed in said battery compartment with the negative end facing said bottom end of said battery compartment.

16. The assembly of claim 15 wherein light source is an LED.

17. The assembly of claim 16 wherein said light further comprises a lens, and wherein said first position is between said LED and said lens.

\* \* \* \* \*